US010075436B2

(12) United States Patent
Takeuchi

(10) Patent No.: US 10,075,436 B2
(45) Date of Patent: Sep. 11, 2018

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Tokyo (JP)

(72) Inventor: Yuri Takeuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 147 days.

(21) Appl. No.: 14/699,400

(22) Filed: Apr. 29, 2015

(65) Prior Publication Data

US 2016/0142406 A1 May 19, 2016

(30) Foreign Application Priority Data

Nov. 17, 2014 (JP) ................................ 2014-232700

(51) Int. Cl.
 H04L 29/06 (2006.01)
 G06K 9/00 (2006.01)
 G06F 21/31 (2013.01)
 G06F 21/60 (2013.01)

(52) U.S. Cl.
 CPC .......... *H04L 63/0861* (2013.01); *G06F 21/31* (2013.01); *G06F 21/608* (2013.01); *G06K 9/00255* (2013.01); *G06K 9/00281* (2013.01); *H04L 63/08* (2013.01)

(58) Field of Classification Search
 CPC . H04L 63/0861; H04L 63/08; G06K 9/00255; G06K 9/0081
 USPC .......................................................... 726/7
 See application file for complete search history.

(56) References Cited

U.S. PATENT DOCUMENTS

| 7,586,635 | B2 | 9/2009 | Maeda et al. | |
|---|---|---|---|---|
| 2011/0103643 | A1* | 5/2011 | Salsman | G06K 9/00261 382/103 |
| 2011/0238995 | A1* | 9/2011 | Blanco | H04L 63/0492 713/173 |
| 2012/0019361 | A1* | 1/2012 | Ben Ayed | G06F 21/32 340/5.83 |
| 2013/0083346 | A1* | 4/2013 | Fujiki | G03G 15/5004 358/1.13 |

(Continued)

FOREIGN PATENT DOCUMENTS

JP 2006-133847 A 5/2006
JP 2010-262454 A 11/2010

(Continued)

OTHER PUBLICATIONS

Communication dated Apr. 4, 2018 from the State Intellectual Property Office of the P.R.C. In counterpart Chinese application No. 201510305446.X.

*Primary Examiner* — Kambiz Zand
*Assistant Examiner* — Tongoc Tran
(74) *Attorney, Agent, or Firm* — Sughrue Mion, PLLC

(57) ABSTRACT

An information processing apparatus includes an authenticating section, a detecting section, and a processor. The authenticating section authenticates a user. When the authenticating section has authenticated a first user, the detecting section detects a second user in the vicinity of the information processing apparatus. The second user is different from the first user. When the detecting section detects the second user, the processor performs a predetermined process.

13 Claims, 4 Drawing Sheets

(56) References Cited

U.S. PATENT DOCUMENTS

| | | | | |
|---|---|---|---|---|
| 2013/0174243 A1* | 7/2013 | Inatomi | ............... | H04L 9/3231 |
| | | | | 726/7 |
| 2014/0123273 A1* | 5/2014 | Matus | ................... | G06F 21/32 |
| | | | | 726/17 |
| 2014/0168687 A1* | 6/2014 | Kim | ................... | H04N 1/00342 |
| | | | | 358/1.14 |
| 2016/0125180 A1* | 5/2016 | Smith | ................... | G06F 21/34 |
| | | | | 726/7 |

FOREIGN PATENT DOCUMENTS

| | | |
|---|---|---|
| JP | 2013-143091 A | 7/2013 |
| JP | 2014-111353 A | 6/2014 |

* cited by examiner

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-232700 filed Nov. 17, 2014.

BACKGROUND (i) Technical Field

The present invention relates to an information processing apparatus, an information processing method, and a non-transitory computer readable medium.

(ii) Related Art

A known information processing apparatus is provided with a sensor or a camera for detecting a user.

SUMMARY

According to an aspect of the present invention, there is provided an information processing apparatus including an authenticating section, a detecting section, and a processor. The authenticating section authenticates a user. When the authenticating section has authenticated a first user, the detecting section detects a second user in the vicinity of the information processing apparatus. The second user is different from the first user. When the detecting section detects the second user, the processor performs a predetermined process.

BRIEF DESCRIPTION OF THE DRAWINGS

Exemplary embodiments of the present invention will be described in detail based on the following figures, wherein.

DETAILED DESCRIPTION

Figure 1:
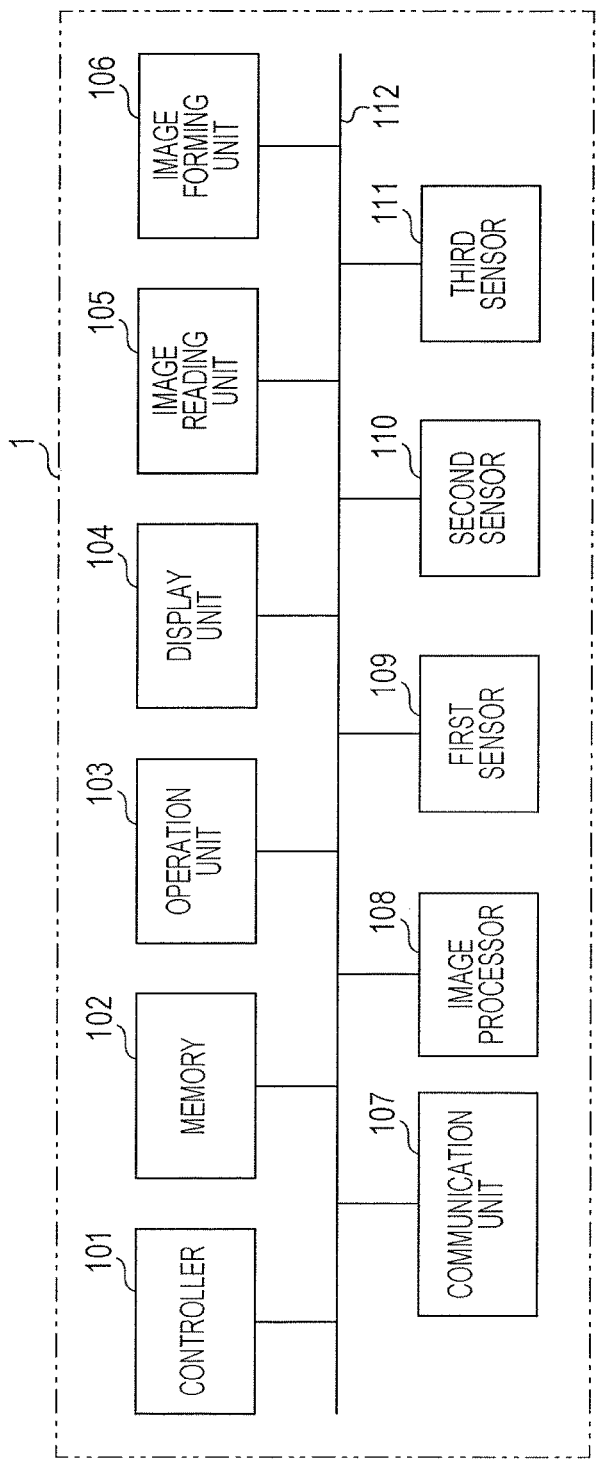
FIG. 1 is a block diagram illustrating the hardware configuration of an image forming apparatus.

FIG. 1 is a block diagram illustrating the hardware configuration of an image forming apparatus 1 according to an exemplary embodiment of the present invention. As illustrated in FIG. 1, the image forming apparatus 1 is an information processing apparatus including a controller 101, a memory 102, an operation unit 103, a display unit 104, an image reading unit 105, an image forming unit 106, a communication unit 107, an image processor 108, a first sensor 109, a second sensor 110, and a third sensor 111. The units of the image forming apparatus 1 which are connected to a bus 112 receive/transmit various data via the bus 112.

The controller 101 controls operations of the units of the image forming apparatus 1. The controller 101 includes an arithmetic processing unit such as a central processing unit (CPU), and storage media (main storages), such as a read only memory (ROM) and a random access memory (RAM). The CPU reads programs stored in the ROM and the memory 102, and executes the programs by using the RAM as a work area. The controller 101 thus executes the programs, thereby achieving a function of forming an image on a sheet of paper (exemplary recording medium), a function of reading an image from a document and generating image data, a function of communicating with another apparatus via a communication line, and the like. The controller 101 controls the operating condition of the units, such as the display unit 104, the image reading unit 105, and the image forming unit 106, in the image forming apparatus 1. The operating condition of the units in the image forming apparatus 1 includes at least a normal condition and a power-saving condition. The normal condition is a condition in which power supply to the units in the image forming apparatus 1 is higher than that in the power-saving condition. The power-saving condition is a condition in which the power supply to the units in the image forming apparatus 1 is lower than that in the normal condition. Specifically, the controller 101 controls the power supply to the units in the image forming apparatus 1 from a power source (not illustrated) in accordance with a signal from the first sensor 109 and the second sensor 110, thereby controlling the operating condition of the units in the image forming apparatus 1.

The memory 102 stores data. The memory 102 which includes a storage medium (auxiliary storage), such as a hard disk or a flash memory, stores data received by the communication unit 107 and data generated in the image forming apparatus 1. The memory 102 may include a so-called removable storage medium (removable media), such as a memory card or a USB memory, and a unit for reading/writing data from/to the storage medium. The memory 102 stores a reduction program described below.

The operation unit 103 receives a user operation. The operation unit 103 which includes operators (such as various buttons, e.g., a start button and a logout button, and keys) supplies a control signal according to a pressed operator to the controller 101. In the exemplary embodiment, the start button on the operation unit 103 is pressed to start using various services, such as copying, printing, scanning, and facsimile transmission/reception, in the image forming apparatus 1, as described below. The logout button is pressed to invalidate the authentication state of a user who has been authenticated by the image forming apparatus 1, as described below.

The display unit 104 displays information. The display unit 104 includes, for example, a liquid-crystal display as a display apparatus. The display unit 104 displays an image used to operate the image forming apparatus 1, under the control exerted by the controller 101. In addition, the display unit 104 is provided with a sensor on the display surface, and functions as a touch panel supplying a control signal according to a pressed position to the controller 101.

The image reading unit 105 reads a document and converts the read document into image data. The image reading unit 105 is provided with an image reading device which optically reads a document and which generates image data representing an image of the read document. The image reading unit 105 supplies the generated image data to the image processor 108.

The image forming unit 106 forms an image on a sheet of paper. The image forming unit 106 includes an image forming mechanism (for example, a photoconductor drum, a transfer roller, and an exposure apparatus) for forming toner images of the color components of yellow (Y), magenta (M), cyan (C), and black (K) on a sheet of paper by using an electrophotographic system, and a discharge mechanism (for example, conveying rollers) for discharging the sheet of paper on which an image is formed, from a discharge slot. The image forming mechanism is not limited to the electrophotographic system, and another recording system such as an inkjet system may be used. In the exemplary embodiment of the present invention, the image forming apparatus 1 is provided with multiple discharge slots at different positions on the image forming apparatus 1.

The communication unit 107 receives/transmits data. The communication unit 107 is connected to a communication line (not illustrated), and functions as a communication interface communicating with an external apparatus.

The image processor 108 performs image processing on image data. Examples of the image processing herein include color correction and tone correction. When the print function is performed in the image forming apparatus 1, the image processor 108 supplies image data which has been subjected to the image processing, to the image forming unit 106.

The first sensor 109 and the second sensor 110 are sensors detecting a person, and the detection may cause the operating condition of the units in the image forming apparatus 1 to transition. The first sensor 109 detects a person in the vicinity of the image forming apparatus 1 which is in the power-saving condition, and is, for example, an infrared sensor using the pyroelectric effect of a pyroelectric element. The expression "in the vicinity of the image forming apparatus 1" means an area in which a sensor is capable of detecting a person or an area within a predetermined distance from the image forming apparatus 1. The first sensor 109 outputs a signal indicating that a person is detected, to the controller 101. The second sensor 110 detects a person in the vicinity of the image forming apparatus 1, and is provided, for example, with a camera function for photographing a human body such as a leg. The second sensor 110 is a sensor whose power consumption is higher than that of the first sensor 109. To suppress the power consumption, the second sensor 110 is not always activated, and is activated when the first sensor 109 detects a person. When the second sensor 110 detects a person getting near the image forming apparatus 1, the controller 101 releases the power-saving condition of the units in the image forming apparatus 1 (causes the operating condition of the units in the image forming apparatus 1 to transition from the power-saving condition to the normal condition).

The various services, such as copying, printing, scanning, and facsimile reception/transmission, in the image forming apparatus 1 are provided in the state in which a user has been authenticated. The user authentication is performed to restrict use of the various services in the image forming apparatus 1 to a user having permission. The third sensor 111 is a sensor for authenticating a user, and is provided with a camera function. The third sensor 111 uses the camera function to capture an image used for user authentication. Specifically, the third sensor 111 photographs a portion specific to an individual, such as the face of a user, to detect authentication information from the user. The controller 101 checks the authentication information detected from the image captured by the third sensor 111 against information which represents characteristics such as the face of an individual, and which is stored in advance in the memory 102, thereby authenticating the user.

In the case where multiple users use the image forming apparatus 1, while a first user is using the image forming apparatus 1, a second user may line up behind the first user. The image forming apparatus 1 according to the exemplary embodiment of the present invention detects the second user who is lining up behind the first user who is using the image forming apparatus 1, and performs a predetermined process (hereinafter referred to as a "waiting-time reducing process") to reduce the waiting time (period from a time when the second user lines up behind the first user to a time when the second user starts an operation on the image displayed on the display unit 104) of the second user. The detail of the waiting-time reducing process will be described.

Figure 2:
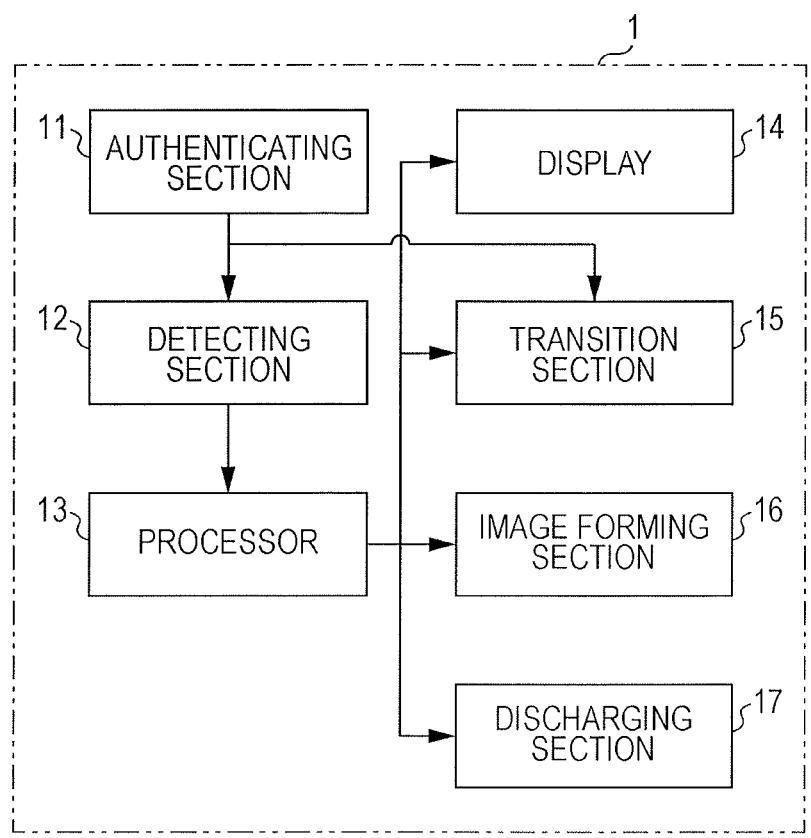
FIG. 2 is a block diagram illustrating the functional configuration of the image forming apparatus.

FIG. 2 is a block diagram illustrating the functional configuration of the image forming apparatus 1. The image forming apparatus 1 includes an authenticating section 11, a detecting section 12, a processor 13, a display 14, a transition section 15, an image forming section 16, and a discharging section 17. The authenticating section 11 authenticates a user who uses the image forming apparatus 1. When the authenticating section 11 has authenticated the first user, the detecting section 12 detects the second user different from the first user, in the vicinity of the image forming apparatus 1. When the detecting section 12 detects the second user, the processor 13 performs the waiting-time reducing process. The display 14 displays an image (which is, for example, a menu image for using the various services of the image forming apparatus 1, and which is hereinafter referred to as an "operation image") used to operate the image forming apparatus 1. When the authenticating section 11 invalidates the authentication state of the user, the transition section 15 causes the operating condition of the units in the image forming apparatus 1 to transition to the power-saving condition. The image forming section 16 forms an image on a sheet of paper. The image forming section 16 performs a process (which is, for example, cleaning of a photoconductor drum and which is hereinafter referred to as a "setup process") for preparing image formation with a predetermined frequency. The discharging section 17 discharges a sheet of paper on which the image forming section 16 forms an image.

In FIG. 1, the third sensor 111 controlled by the controller 101 which executes the reduction program for performing the waiting-time reducing process is an exemplary authenticating section 11. The second sensor 110 controlled by the controller 101 which executes the reduction program is an exemplary detecting section 12. The controller 101 which executes the reduction program is an example of the processor 13 and the transition section 15. The display unit 104 controlled by the controller 101 which executes the reduction program is an exemplary display 14. The image forming unit 106 is an example of the image forming section 16 and the discharging section 17.

Figure 3:
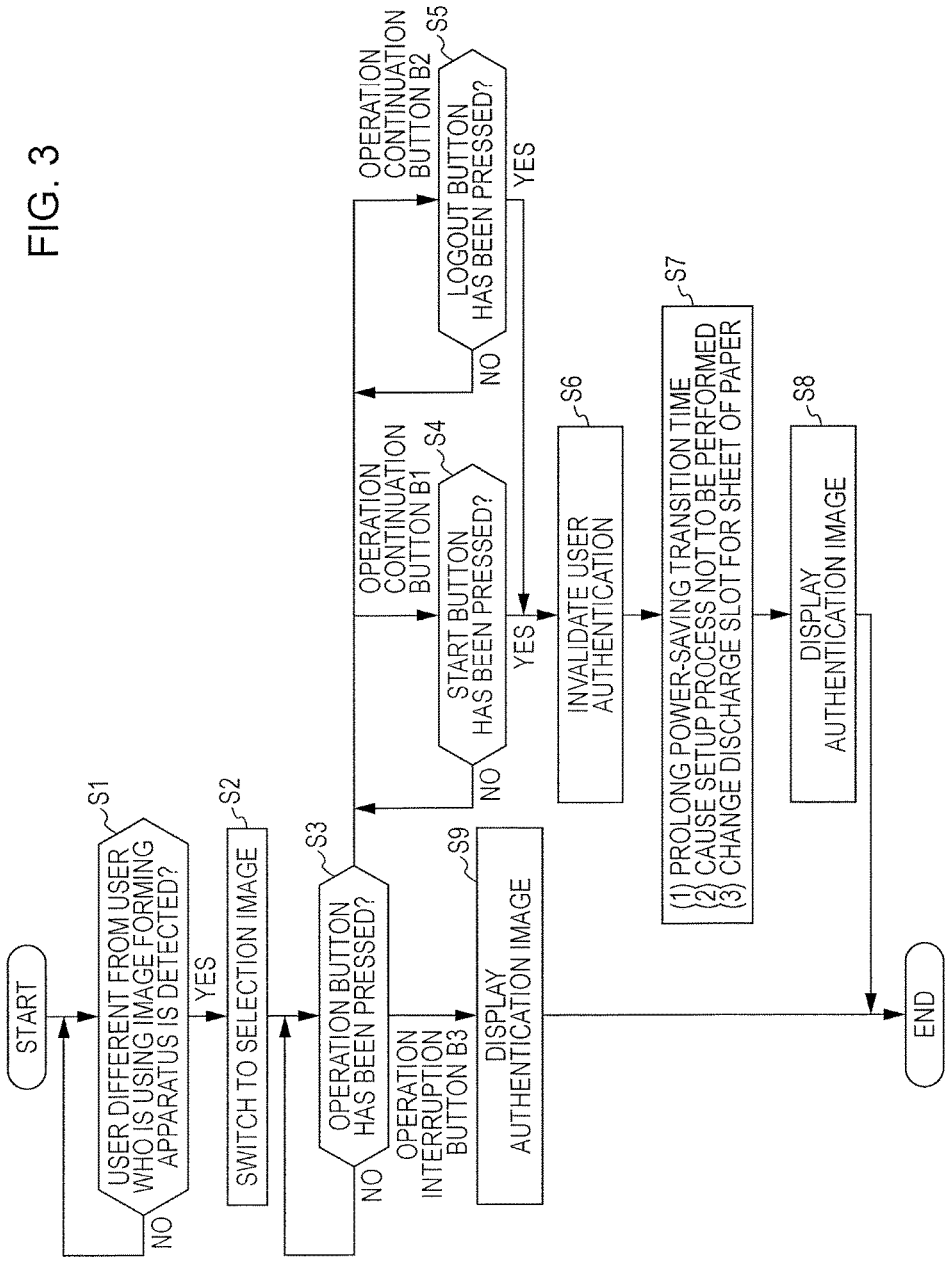
FIG. 3 is a flowchart of an operation performed by the image forming apparatus.

FIG. 3 is a flowchart of an operation performed by the image forming apparatus 1. The flow in FIG. 3 starts in the state in which the image forming apparatus 1 has authenticated a first user (hereinafter referred to as a "user U1"), that is, in the state in which the user U1 is using the image forming apparatus 1. In the present exemplary embodiment, the second sensor 110 is activated when a user approaches the image forming apparatus 1. After the user is authenticated by the image forming apparatus 1, while the user is using the image forming apparatus 1, the second sensor 110 continues to be activated. As described below, this is because the position of the user who has been authenticated is to be traced.

In step S1, the controller 101 determines whether or not the second sensor 110 detects a user different from the user U1. Specifically, the controller 101 uses the second sensor 110 to continuously photograph the body (such as a leg) of the user U1, thereby tracing the user U1. When the second sensor 110 photographs the body of a user different from the traced user U1, the controller 101 determines that the second sensor 110 detects a user different from the user U1. If it is determined that a user different from the user U1 is detected (YES in step S1), the controller 101 proceeds the process to step S2. If it is determined that a user different from the user U1 is not detected (NO in step S1), the controller 101 waits the process until a user different from the user U1 is detected. Hereinafter, a user who is different from the user U1 and who has been detected by the second sensor 110 is referred to as a "user U2".

In step S2, the controller 101 switches from the operation image which has been displayed on the display unit 104 to an image (hereinafter referred to as a "selection image") for causing the user U1 to select whether the user U1 is to continue the operation or the user U2 is to perform an operation.

Figure 4:
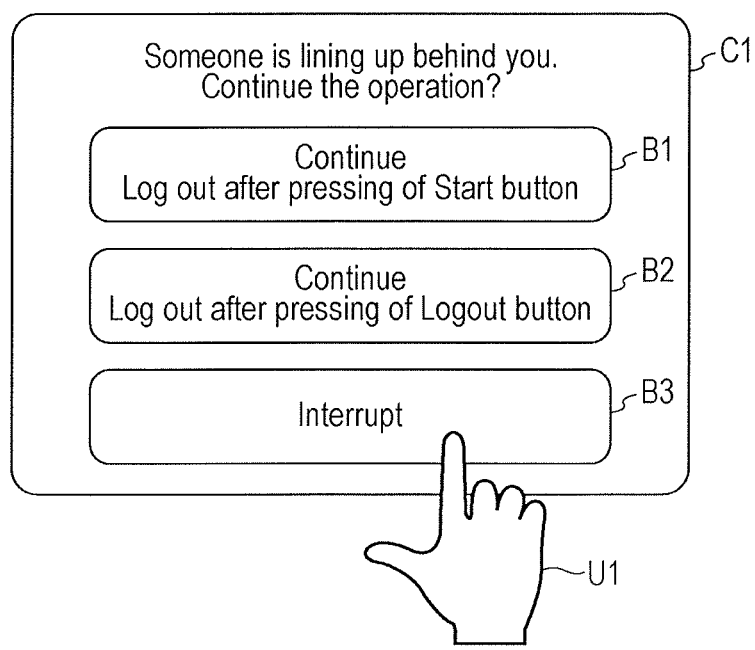
FIG. 4 is a diagram illustrating an exemplary selection image.

FIG. 4 is a diagram illustrating an exemplary selection image. In this example, an selection image C1 includes a message that another user is lining up behind the user U1, and three operation buttons B (an operation continuation button B1, an operation continuation button B2, and an operation interruption button B3). The operation continuation button B1 and the operation continuation button B2 are buttons for causing the user U1 to continue the operation. The difference between the operation continuation button B1 and the operation continuation button B2 is as follows. Pressing on the operation continuation button B1 causes the authentication state of the user to be invalidated when an operation (in this example, pressing of the start button on the operation unit 103) for starting using the various services provided by the image forming apparatus 1 is performed. In contrast, pressing on the operation continuation button B2 causes the authentication state of the user to be invalidated when an operation (in this example, pressing of the logout button on the operation unit 103) for invalidating the authentication state is performed. When the operation continuation button B1 is pressed, without performing an operation for invalidating the authentication state, the authentication state of the user U1 is invalidated. Therefore, the user U2 may start using the image forming apparatus 1 earlier than the case in which the operation continuation button B2 is pressed. The operation interruption button B3 is a button for causing the user U1 to stop using the image forming apparatus 1 and causing the user U2 to operate the image forming apparatus 1. When the selection image C1 is displayed on the display unit 104, the user U1 selects one operation button B from the three operation buttons B, and presses the selected operation button B.

FIG. 3 will be referred to again. In step S3, the controller 101 determines whether or not an operation button B included in the selection image C1 has been pressed. If it is determined that the operation continuation button B1 has been pressed, the controller 101 causes the display unit 104 to display again the operation image which is displayed on the display unit 104 before switching to the selection image C1 is made, and proceeds the process to step S4. If it is determined that the operation continuation button B2 has been pressed, the controller 101 causes the display unit 104 to display again the operation image which is displayed on the display unit 104 before switching to the selection image C1 is made, and proceeds the process to step S5. When pressing of the operation continuation button B1 or the operation continuation button B2 causes the operation image to be displayed again on the display unit 104, the user U1 continues using the image forming apparatus 1. If it is determined that the operation interruption button B3 has been pressed, the controller 101 invalidates the authentication state of the user U1, and proceeds the process to step S9. If no operation buttons B have been pressed (NO in step S3), the controller 101 waits until an operation button B is pressed.

In step S4, the controller 101 determines whether or not the start button has been pressed. If it is determined that the start button has been pressed (YES in step S4), the controller 101 proceeds the process to step S6. If it is determined that the start button has not been pressed (NO in step S4), the controller 101 waits until the start button is pressed.

In step S5, the controller 101 determines whether or not the logout button has been pressed. If it is determined that the logout button has been pressed (YES in step S5), the controller 101 proceeds the process to step S6. If it is determined that the logout button has not been pressed (NO in step S5), the controller 101 waits until the logout button is pressed.

In step S6, the controller 101 invalidates the authentication state of the user U1. In step S7, the controller 101 performs three processes (1) to (3) described below.

(1) The period until a transition of the operating condition of the units in the image forming apparatus 1 to the power-saving condition is made is prolonged.

When a predetermined time (hereinafter referred to as a "power-saving transition time") has elapsed after the user authentication state is invalidated, the controller 101 causes the operating condition of the units in the image forming apparatus 1 to transition to the power-saving condition. In step S7, the controller 101 prolongs the power-saving transition time. By prolonging the power-saving transition time, likelihood that the operating condition of the units in the image forming apparatus 1 transitions to the power-saving condition before the user U2 starts operating the image forming apparatus 1 is reduced. This prevents the user U2 from waiting release of the power-saving condition for the units in the image forming apparatus 1, reducing the waiting time of the user U2.

(2) The setup process is not performed until the authentication state of a user authenticated subsequently to the user U1 is invalidated.

Until the authentication state of a user who has been authenticated subsequently to the user U1 is invalidated, the controller 101 controls the image forming unit 106 so that the setup process is not performed. This prevents the setup process from being performed before the user U2 starts operating the image forming apparatus 1, reducing the waiting time of the user U2.

(3) The discharge slot through which a sheet of paper is to be discharged is changed.

When the user U2 is not detected, the controller 101 controls the image forming unit 106 so that a sheet of paper is discharged through a first discharge slot. In step S7, the controller 101 controls the image forming unit 106 so that a sheet of paper is discharged through a second discharge slot located at a position farther from the display unit 104 than the first discharge slot. When a sheet of paper is discharged from the second discharge slot, the user U1 moves to the second discharge slot to get the discharged sheet of paper. Therefore, the user U1 leaves the display unit 104, whereby the user U2 may start an operation on the image displayed on the display unit 104 earlier than the case in which the sheet of paper is discharged from the first discharge slot. When the process (3) is performed, a message that the sheet of paper is to be discharged from the second discharge slot may be displayed on the display unit 104.

In steps S8 and S9, the controller 101 causes an image (hereinafter referred to as an "authentication image") for authenticating the user U2 to be displayed on the display unit 104. As described above, the image forming apparatus 1 performs user authentication by photographing a user with the third sensor 111. Therefore, the authentication image includes, for example, a button for starting a photographing operation and a message to prompt a user to turn his/her face toward the third sensor 111. In step S8, the authentication image may include a message indicating that use of the image forming apparatus 1 may be started (for example, a message of "You may start using the image forming apparatus now"). When the user U2 is successfully authenticated, the controller 101 displays the menu image on the display unit 104.

According to the above-described processes, when the image forming apparatus 1 detects a second user different from a first user while the first user is using the image forming apparatus 1, the image forming apparatus 1 performs the process for reducing the waiting time of the second user. When the image forming apparatus 1 does not detect a second user, the selection image is not displayed on the display unit 104, and the first user continues using the image forming apparatus 1.

An exemplary embodiment of the present invention is not limited to the above-described exemplary embodiment, and various modifications may be made. Some modified exemplary embodiments will be described below. Two or more of the modified exemplary embodiments described below may be combined with one another, and the combined exemplary embodiment may be used.

An image displayed on the display unit 104 after the operation interruption button B3 is pressed is not limited to the authentication image. When the operation interruption button B3 is pressed, the menu image may be displayed on the display unit 104. In this case, the user U2 uses the various services of the image forming apparatus 1 by using the account of the user U1.

The method with which the image forming apparatus 1 authenticates a user is not limited to the method with which authentication is performed by photographing a user. For example, a user may operate the operation unit 103 to input a password, whereby the image forming apparatus 1 may authenticate the user. In another example, a user may hold an integrated circuit (IC) card over an IC card reader (not illustrated), whereby the image forming apparatus 1 may authenticate the user.

The controller 101 may individually control the operating condition of each of the units in the image forming apparatus 1. For example, when the second sensor 110 detects a person getting near the image forming apparatus 1, without releasing the power-saving condition of the image reading unit 105 and that of the image forming unit 106, the power-saving condition of the display unit 104 may be released. In this case, the power-saving condition of the image reading unit 105 and that of the image forming unit 106 are released in the state in which the menu image is displayed on the display unit 104 and after an operation for using the various functions of the image forming apparatus 1 is received. As an example, when a user who operates the menu image gives an instruction to use the scan function or the facsimile function, the power-saving condition of the image reading unit 105 may be released. When the user gives an instruction to use the print function, the power-saving condition of the image forming unit 106 may be released. When the user gives an instruction to use the copy function, the power-saving condition of the image reading unit 105 and that of the image forming unit 106 may be released.

The start button and the logout button are not limited to physical buttons on the operation unit 103. The start button and the logout button may be touch-panel buttons displayed on the display unit 104. In this case, the start button and the logout button are included in the operation image displayed on the display unit 104.

The information processing apparatus in which the waiting-time reducing process is performed is not limited to the image forming apparatus 1. For example, in other information processing apparatuses, such as a display apparatus which displays information and an image processing apparatus which performs image processing, the waiting-time reducing process may be performed.

The hardware configuration of the image forming apparatus is not limited to the configuration illustrated in FIG. 1. The image forming apparatus 1 may have any hardware configuration as long as the configuration is capable of performing the processes in the steps illustrated in FIG. 3.

In the exemplary embodiment, the reduction program executed by the image forming apparatus 1 may be provided by storing the program in a computer-readable storage medium, such as a magnetic storage medium, e.g., a magnetic tape or a magnetic disk (a hard disk drive (HDD), a flexible disk (FD)), an optical storage medium, e.g., an optical disk (a compact disk (CD), a digital versatile disk (DVD)), a magneto-optical storage medium, or a semiconductor memory e.g., a flash ROM. The program may be downloaded via a network such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an authenticating section configured to authenticate a first user;
   a detecting section configured to, in response to the authenticating section authenticating the first user, detect a second user in a vicinity of the information processing apparatus, the second user being different from the first user;
   a display configured to display an image used to operate the information processing apparatus;
   a processor configured to, in response to the detecting section detecting the second user, switch the image displayed by the display to a selection image that displays a first selection option for allowing the first user to continue performing a first operation and a second selection option for allowing the second user to perform a second operation;
   an image forming section configured to form an image on a recording medium; and
   a discharging section configured to discharge the recording medium on which the image forming section has formed the image,
   wherein the processor is configured to, in response to the detecting section not detecting the second user, control the discharging section in such a manner that the recording medium is discharged from a first discharge slot, and wherein the processor is configured to, in response to the detecting section detecting the second user, control the discharging section in such a manner that the recording medium is discharged from a second discharge slot located at a position farther from the display than the first discharge slot.

2. The information processing apparatus according to claim 1,
wherein the authenticating section is configured to, in response to the first selection option indicating that the first user is to continue performing the first operation being selected on the selection image, and in response to the first user performing an operation for starting using a service provided by the information processing apparatus, invalidate an authentication state of the first user without performing an operation for invalidating the authentication state.

3. The information processing apparatus according to claim 2,
wherein the display is configured to, in response to the authentication state of the first user being invalidated in response to the first user performing the operation for starting using the service, display an image for causing the authenticating section to authenticate the second user.

4. The information processing apparatus according to claim 1,
wherein the display is configured to, in response to the second selection indicating that the second user is to perform the second operation being made on the selection image, display an image for causing the authenticating section to authenticate the second user.

5. The information processing apparatus according to claim 3,
wherein the display is configured to, in response to the second selection option indicating that the second user is to perform the second operation being selected on the selection image, display an image for causing the authenticating section to authenticate the second user.

6. The information processing apparatus according to claim 1, further comprising:
a transition section configured to, in response to an authentication state of a user who has been authenticated by the authenticating section being invalidated, cause a condition of the information processing apparatus to transition to a power-saving condition,
wherein the processor is configured to, in response to the detecting section detecting the second user, prolong a period from a first time when the authentication state of the first user is invalidated to a second time when the transition section causes the condition of the information processing apparatus to transition to the power-saving condition.

7. The information processing apparatus according to claim 2, further comprising:
a transition section configured to, in response to an authentication state of a user who has been authenticated by the authenticating section being invalidated, cause a condition of the information processing apparatus to transition to a power-saving condition,
wherein the processor is configured to, in response to the detecting section detecting the second user, prolong a period from a first time when the authentication state of the first user is invalidated to a second time when the transition section causes the condition of the information processing apparatus to transition to the power-saving condition.

8. The information processing apparatus according to claim 3, further comprising:
a transition section configured to, in response to an authentication state of a user who has been authenticated by the authenticating section being invalidated, cause a condition of the information processing apparatus to transition to a power-saving condition,
wherein the processor is configured to, in response to the detecting section detecting the second user, prolong a period from a first time when the authentication state of the first user is invalidated to a second time when the transition section causes the condition of the information processing apparatus to transition to the power-saving condition.

9. The information processing apparatus according to claim 4, further comprising:
a transition section configured to, in response to an authentication state of a user who has been authenticated by the authenticating section being invalidated, cause a condition of the information processing apparatus to transition to a power-saving condition,
wherein the processor is configured to, in response to the detecting section detecting the second user, prolong a period from a first time when the authentication state of the first user is invalidated to a second time when the transition section causes the condition of the information processing apparatus to transition to the power-saving condition.

10. The information processing apparatus according to claim 5, further comprising:
a transition section configured to, in response to an authentication state of a user who has been authenticated by the authenticating section being invalidated, cause a condition of the information processing apparatus to transition to a power-saving condition,
wherein the processor is configured to, in response to the detecting section detecting the second user, prolong a period from a first time when the authentication state of the first user is invalidated to a second time when the transition section causes the condition of the information processing apparatus to transition to the power-saving condition.

11. The information processing apparatus according to claim 1,
wherein the image forming section is further configured to form the image on the recording medium and to perform a process for preparing image formation with a predetermined frequency, and
wherein the processor is configured to, in response to the detecting section detecting the second user, control the image forming section in such a manner that the process for preparing image formation is not performed until an authentication state of a user is invalidated, the user having been authenticated by the authenticating section subsequently to the first user.

12. A non-transitory computer readable medium storing a program causing a computer to execute a process, the process comprising:
authenticating a first user;
in response to the first user being authenticated, detecting a second user in a vicinity of the computer, the second user being different from the first user;
displaying, by a display, an image used to operate the computer; and
in response to the second user being detected, switching the image displayed by the display to a selection image that displays a first selection option for allowing the first user to continue performing a first operation and a second selection operation for allowing the second user to perform a second operation;

forming an image on a recording medium;

discharging the recording medium which the image is formed;

controlling, in response to not detecting the second user, the recording medium to be discharged from a first discharge slot, and controlling, in response to detecting the second user, the recording medium to be discharged from a second discharge slot located at a position farther from the display than the first discharge slot.

13. An information processing method, the method comprising:

authenticating a first user;

in response to the first user being authenticated, detecting a second user in a vicinity of a computer, the second user being different from the first user;

displaying, by a display, an image used to operate the computer; and in response to the second user being detected, switching the image displayed by the display to a selection image that displays a first selection option for allowing the first user to continue performing a first operation and a second selection operation for allowing the second user to perform a second operation;

forming an image on a recording medium;

discharging the recording medium on which the image is formed;

controlling, in response to not detecting the second user, the recording medium to be discharged from a first discharge slot, and controlling, in response to detecting the second user, the recording medium to be discharged from a second discharge slot located at a position farther from the display than the first discharge slot.

* * * * *